March 19, 1968     H. RUBELMANN     3,374,162
CONTROL UNIT FOR AUTOMATIC CATHODIC PROTECTION
Filed Aug. 21, 1962     11 Sheets-Sheet 1

INVENTOR

HAYDN RUBELMANN

BY    *Vincent L. Carney*

ATTORNEY

INVENTOR
HAYDN RUBELMANN
BY Vincent L. Carney
ATTORNEY

INVENTOR
HAYDN RUBELMANN

March 19, 1968 H. RUBELMANN 3,374,162
CONTROL UNIT FOR AUTOMATIC CATHODIC PROTECTION
Filed Aug. 21, 1962 11 Sheets-Sheet 4

INVENTOR
HAYDN RUBELMANN
BY *Vincent L. Carney*
ATTORNEY

INVENTOR
HAYDN RUBELMANN
BY Vincent L. Carney
ATTORNEY

March 19, 1968 H. RUBELMANN 3,374,162
CONTROL UNIT FOR AUTOMATIC CATHODIC PROTECTION
Filed Aug. 21, 1962 11 Sheets-Sheet 10

INVENTOR
HAYDN RUBELMANN
BY Vincent L. Carney
ATTORNEY

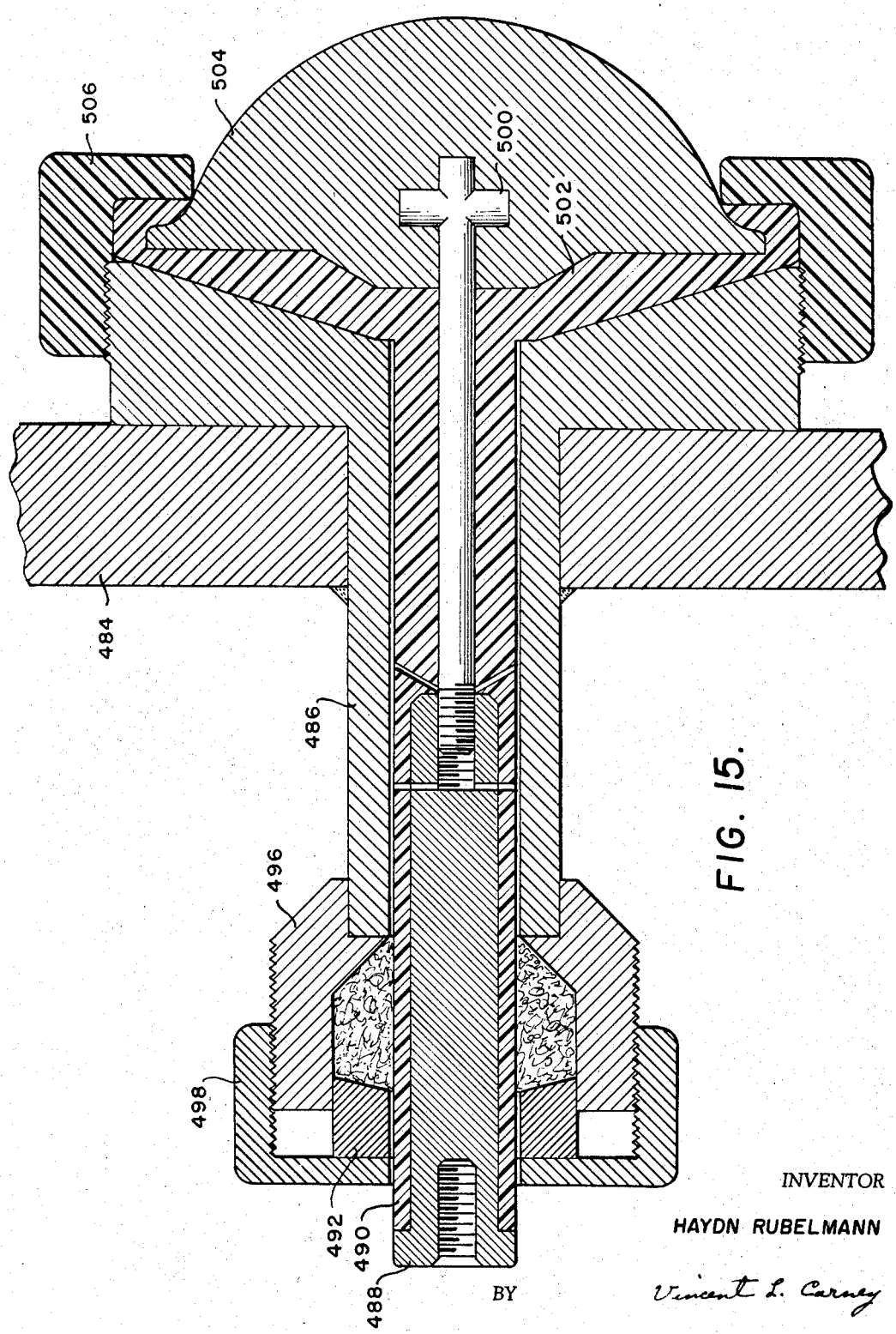

United States Patent Office 3,374,162
Patented Mar. 19, 1968

3,374,162
CONTROL UNIT FOR AUTOMATIC
CATHODIC PROTECTION
Haydn Rubelmann, 1201 McDonald Road,
Norfolk, Va. 23500
Filed Aug. 21, 1962, Ser. No. 218,468
8 Claims. (Cl. 204—196)

The invention described herein may be manufactured and used by or for the Government of the United States of America for governmental purposes without the payment of any royalties thereon or therefor.

This invention relates to controlled power supplies; and, more particularly, relates to controlled power supplies for cathodic protection systems such as those used on structures of vessels which are normally submerged in water or in an electrolyte; and still more specifically relates to cathodic protective systems with automatically controlled power supplies.

Cathodic protection of structures which are submerged in an electrolyte is provided by impressing on the structures a direct current (DC) voltage that tends to oppose the galvanic and man-made voltages which aid the process of corrosion or electrolysis. Cathodic protection systems are extensively used to preserve steel structures in water and especially to preserve the hull of ships at sea, in port, or in an inactive status, thus reducing extensive drydocking periods. It may also retard marine growth. Cathodic protection systems usually include a power supply for providing the aforesaid direct current voltage, and a control unit for adjusting the output of the power supply.

These control units are usually manually adjusted to control the output of the power supply, which has the disadvantage of requiring frequent measuring of the ship's hull potential and adjustment of the current flow to the hull. This is because the current requirements vary substantially with the speed of motion of the ship's hull through the water and with the condition of the water as an electrolyte.

Attempts to use automatic controls such as controls which are dependent upon the measurement of current have, heretofore, not been too successful. For satisfactory operation on board ship, controlled power supplies for automatic cathodic protection units must be sensitive to low voltages, be able to control large amounts of current, be able to withstand heavy vibration and require little maintenance. Accordingly, it is an object of this invention to provide a controlled power supply which is suitable for use in cathodic protection systems.

A further object is to provide an automatic cathodic protection system which does not require moving parts and which is not greatly affected by changes in the electrolyte in which the protected structure is immersed. It is desired that the current flow to the protected structure be initiated automatically by the potential of the structure and that this potential be sensed when little current is flowing. This eliminates moving parts and reduces the effect of changes in the resistance of the electrolyte on the control unit of the cathodic protection system.

Still another object of this invention is to provide an automatic cathodic protection system which is sturdy, requires little maintenance and is inexpensive. Preferably, the system utilizes silicon controlled rectifiers. These units are sturdy and require little maintenance. Because of their high gain, a minimum number of amplification stages are needed.

More specifically, the invention contemplates the cathodic protection of a ship's hull which is immersed in water from corrosion by the maintenance of a voltage between the hull structure and a protective anode or plurality of anodes which are immersed in the water on or near the ship. In accordance with the invention, the voltage between the hull and the protective anodes is continually monitored and compared with a standard or reference voltage. The comparison circuit is connected to the gate of a silicon controlled rectifier and tends to hold this gate open when the sensed voltage between the hull and the protective anodes is too low to prevent electrolysis and tends to hold this gate closed when this sensed voltage is so high as to damage the paint of the structure or otherwise produce damage. The flow of current also keeps the protective anodes clean. In this manner the potential of the ship's hull is regulated automatically even though the load on the cathodic protection system may vary because of changes in the speed of the ship, changes in temperature, or for other reasons.

Other objects and many of the attendant advantages of this invention will be readily appreciated as the same becomes better understood by reference to the following detailed description when considered in connection with the accompanying drawings wherein:

FIG. 15 is a section of a cathodic protection assembly.

In general the invention contemplates the control of the voltage of a protected structure using a silicon controlled rectifier in a cathodic protection system. Several embodiments are discussed below. The silicon controlled rectifier is gated by a unijunction transistor comparator to maintain the negative potential of the protected structure within a predetermined range.

Figure 1:
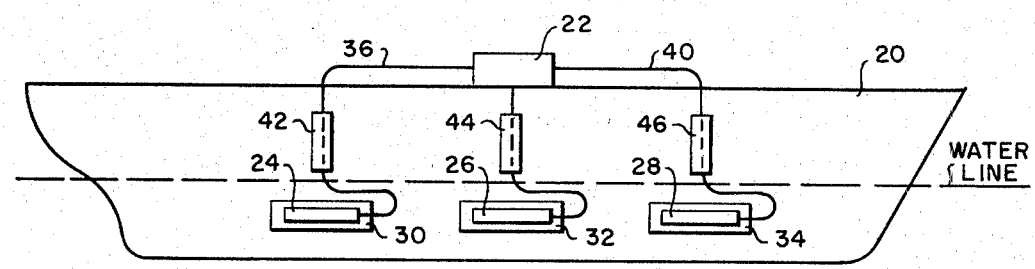
FIG. 1 is a diagrammatic illustration of a cathodic protection system for use on a ship.

Referring now in particular to FIG. 1 of the drawings, a structure 20 such as a ship immersed in water is shown with a cathodic protection system having a regulated power supply 22, cathodic protective anodes 24, 26 and 28 held in place below the water line and spaced from the structure by a plurality of nylon baskets 30, 32, and 34 respectively. The nylon baskets are secured in place by any suitable means. The regulated power supply 22 is connected to the anodes through conductors 36, 38 and 40 which pass insulatedly through steel overboard drain-down pipes 42, 44 and 46 to the anodes.

In the preferred operation with carbon anodes, the regulated power supply 22 should maintain the potential of the structure 20 at a negative 0.90 volt as measured by a copper sulfate cell with a variation of less than 0.05 volt in either direction. The potential of the structure will preferably be maintained at other values when different anode materials are used. If the potential of the structure rises above a negative 0.85 volt electrolytic currents will flow from the structure and corrosion will begin. If the potential of the structure falls below a negative 0.95 volt the paint on the structure will peel.

The necessary voltage is obtained by impressing a positive voltage upon the protective anodes which surround the structure, such as 24, 26, and 28, shown on side of the structure 20 in FIG. 1. This positive voltage is dropped across the electrolyte which separates the anodes from the structure. The power supply 22 which provides the necessary current to the anodes is grounded to the structure. Therefore, the zero-voltage equipotential line passes close to the surface of the structure and the structure itself is maintained at a negative potential. This negative potential inhibits corrosion.

Figure 2:
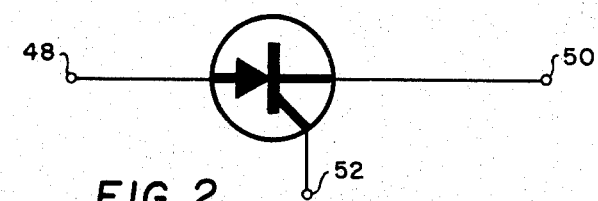
FIG. 2 is a schematic symbol for a silicon controlled rectifier used in an embodiment of the invention.

The current flow from the regulated power supply to the anodes 24, 32 and 34 is controlled by a semiconductor gate. A silicon controlled rectifier is used for this purpose because it combines the small size, high efficiency and reliability that are inherent in semiconductor devices with unique high current and high voltage capabilities. FIG. 2 is a schematic symbol for a silicon controlled rectifier having an anode 48, a cathode 50 and a gate 52.

The silicon controlled rectifier is much like an ordinary rectifier which has been modified so that it will block in the forward direction unless a small signal is applied to the gate. After the silicon controlled rectifier has been gated, it conducts in the forward direction with a forward characteristics similar to that of an ordinary rectifier.

The silicon controlled rectifier is a four-layer diode consisting of four layers of semiconductive material. The four layers form three PN junctions and can be considered as operating in a manner similar to the combination of a PNP transistor with a NPN transistor having a common collection junction. It has characteristics like those of a thyratron but with less forward drop and deionization time.

Figure 3:
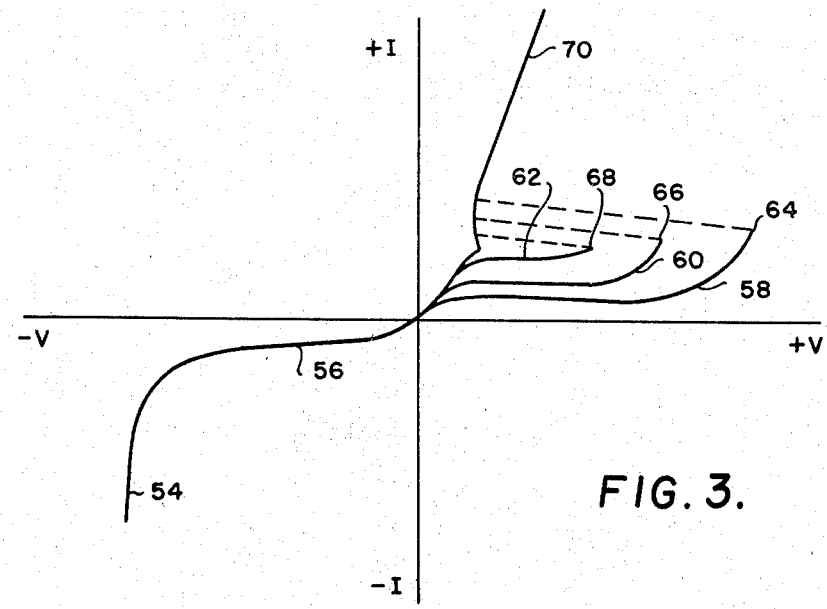
FIG. 3 is a graph of the current-voltage characteristic of the silicon controlled rectifier of FIG. 2 in which the abscissae are voltages and the ordinates are current.

Typical silicon controlled rectifier characteristic curves are shown in FIG. 3, in which 54 represents the reverse avalanche breakdown region; 56 represents the reverse blocking region; 58, 60 and 62 represent forward blocking regions for increasing gate input currents; 64, 66 and 68 represent pickup currents for increasing gate input currents; and 70 represents a high conduction region. The silicon controlled rectifier operates in the forward blocking region and the reference blocking region in the absence of a gating pulse. It acts as a high resistance and provides very little current output in these regions. However, when gated, the forward breakover voltage region is moved to a region requiring less input voltage and the rectifier goes to the high conduction region 70 until turned off.

The gating pulses to the silicon controlled rectifiers in the regulated power supply are provided by unijunction transistors. These transistors compare the voltage between the cathodic structure and the anode with a sensing voltage of opposite polarity, and if the cathodic structure to anode voltage is too low they open the silicon controlled rectifier gates, so as to permit the flow of current to the anodes. The silicon unijunction transistor is particularly suited for firing silicon controlled rectifiers.

Figure 4:
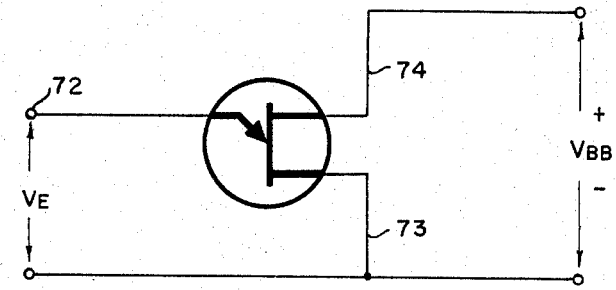
FIG. 4 is a schematic symbol for a unijunction transistor used in an embodiment of the invention.
Figure 5:
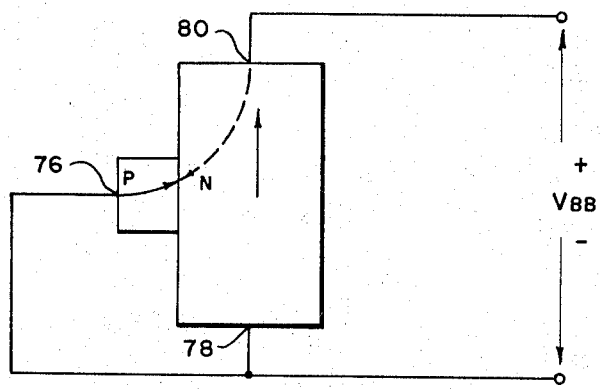
FIG. 5 is a diagrammatic illustration of the current flow in the unijunction transistor of FIG. 4 with no emitter voltage.

FIG. 4 is a schematic symbol for a unijunction transistor having an emitter 72, a first base 73 and a second base 74. This transistor is sometimes called a double-base diode and is actually a diode with two connections made to one portion of the semiconductor. This is shown diagrammatically in FIG. 5, in which 76 is an emitter, 78 is base-one and 80 is base-two of a unijunction transistor. When the emitter is connected to base-one and a source of DC voltage is placed across base-one and base-two with the positive terminal connected to base-two, an electron current flows through the double base from base-one to base-two as indicated, and the PN junction is reverse biased. The only current flowing across this junction is a reverse-bias current consisting of an electron flow from the emitter to the PN junction and a hole flow from the base-two to the PN junction.

Figure 6:
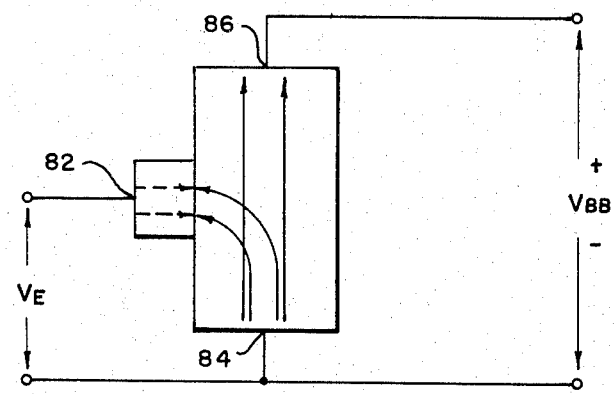
FIG. 6 is a diagrammatic illustration of the current flow in the unijunction transistor of FIG. 4 with an emitter voltage.

FIG. 6 is a diagrammatic illustration of the unijunction transistor of FIG. 4 having emitter 82, base-one 84 and base-two 86 and having a positive emitter voltage sufficient to overcome the voltage gradient between base-one and base-two which is caused by a DC voltage source that is connected across base-one and base-two with its positive terminal connected to base-two. In this case the PN junction is forward biased and heavy electron current flows in the N-type material and a heavy hole current flows in the P-type material. The value of emitter voltage that causes this conduction to start is called the peak voltage point of the transistor. It varies with the base voltage.

The gating pulses from the unijunction transistor to the silicon controlled rectifier may be taken from either the emitter circuit or the base circuit when the unijunction transistor begins to conduct. The comparison between the standard voltage and the anode potential can be made by placing the anode voltage between the emitter and base-one and the standard voltage between base-one and base-two or by placing the anode voltage and the standard voltage in series in the base circuit and using another voltage in the emitter circuit. When the emitter voltage exceeds the peak voltage point the unijunction transistor fires the silicon controlled rectifier and current is allowed to flow to the anodes. As the voltage between base-one and base-two is increased the peak voltage point is also raised.

Figure 7:
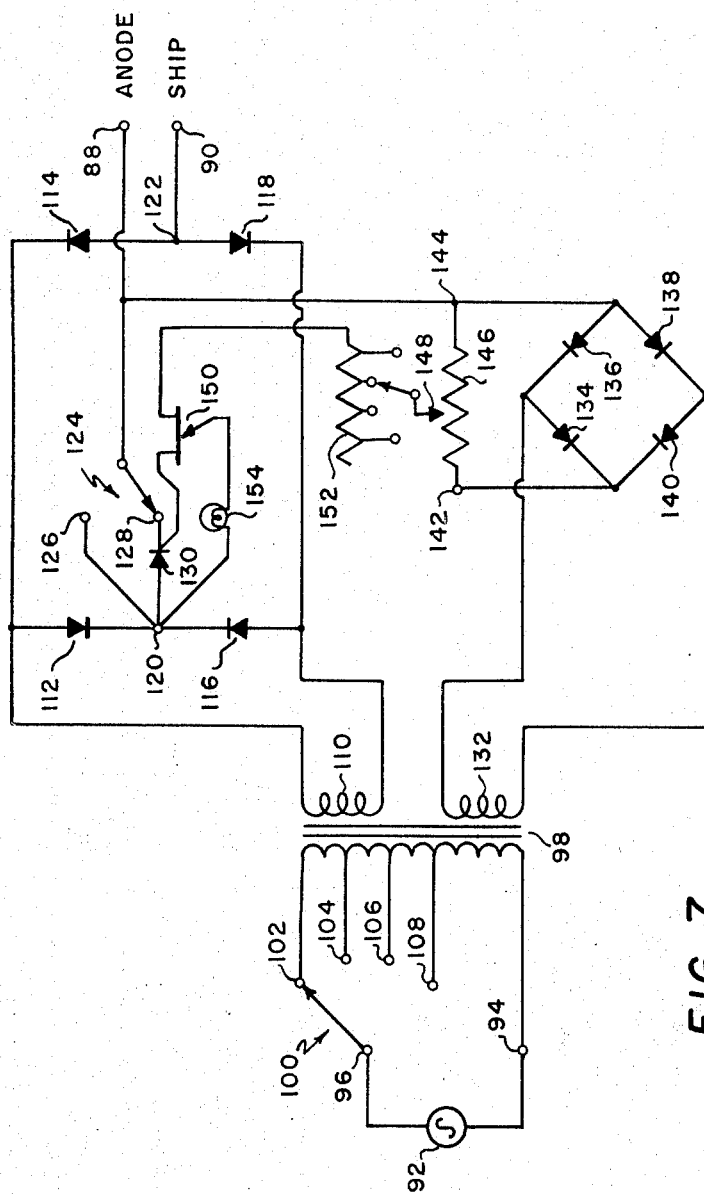
FIG. 7 is a schematic circuit diagram of a full-wave single-controlled regulated power supply in accordance with the invention.

FIG. 7 is a schematic circuit diagram of a power supply adapted to provide cathodic protection to a ship by maintaining a negative voltage on the ship which is connected to terminal 90. A source of AC power is connected to the input of the power supply at terminals 94 and 96.

Terminal 94 is connected to one end of the primary winding of input transformer 98. Terminal 96 is connected to stepping switch 100 having positions 102, 104, 106 and 108, each connected to a different tap on the primary winding of input transformer 98. Therefore, the stepping switch 100 will determine the number of turns of the primary winding of input transformer 98 that will be connected across the source of AC power 92. As the number of turns of the primary winding are decreased the ratio between the primary winding and the secondary winding of step down transformer 98 is also decreased.

Secondary winding 110 of transformer 98 is connected to a full wave bridge rectifier composed of diodes 112, 114, 116 and 118 with one end of secondary winding 110 connected to the anode of diode 112 and to the cathode of diode 114 and with the other end of winding 110 connected to the anode of diode 116 and to the cathode of diode 118. The output of the full-wave bridge rectifier appears at terminal 120, which is connected to the cathode of diode 112 and to the cathode of diode 116, and at terminal 122 which is connected to the anode of diode 114 and to the anode of diode 118. Terminal 120 is electrically connected to the cathodic protection system anodes and terminal 122 is grounded to the ship.

Terminal 120 is directly connected to switch 124. Switch 124 connects terminal 88 which leads to the anodes, to either position 126 or position 128. Position 126 is directly connected to terminal 120 at the output of the bridge rectifier, and position 128 is connected to the voltage regulator which is interposed between the output of the bridge rectifier and the anodes.

Switch 124 is placed in position 126 when the ship is first placed under cathodic protection. The hull potential is low or neutral at this time and the voltage regulator is bypassed until a negative potential can be developed which is close to the desired level; at which time the voltage regulator is switched into the circuit by moving switch 124 from position 126 to position 128. During the time when the ship is being brought up to a potential which is sufficiently negative to permit the use of the automatic voltage regulator, switch 100 is stepped from position to position to control the voltage from the secondary of the input transformer 98. The switch 100 is started at position 102, moved to position 104, 106 and 108 until the potential is brought up to a negative 0.85 volt. At this time the switch 124 is moved to position 128 and the voltage regulator is connected into the circuit.

The controlled power supply used in the circuit of FIG. 7 is composed of a standard or reference voltage, a unijunction transistor firing circuit and a silicon controlled rectifier gate. The silicon controlled rectifier 130 has its anode connected to terminal 120 and has its cathode connected to terminal 88 for the anode when switch 124 is in position 128. This silicon controlled rectifier controls the flow of current to the cathodic protection system anodes.

The reference voltage is derived from another secondary winding 132 on input transformer 98. The output from this winding is applied to a full wave rectifier bridge consisting of diodes 134, 136, 138 and 140, and has one end connected to the anode of diode 134 and the cathode of diode 136 and the other end connected to the anode of diode 140 and the cathode of diode 138. The positive output of the full wave rectifier appears at terminal 142, which is connected to the cathode of diode 134 and the cathode of diode 140; the negative output of the full wave rectifier appears at terminal 144, which is connected to the anode of diode 136 and to the anode of diode 138.

Potentiometer 146 is connected across terminals 142 and 144 and the voltage output from the full wave rectifier is dropped across it. Tap 148 is adjusted to the desired value of standard voltage. This voltage may be selected by measuring the potential of the ship's hull with a saturated copper sulphate cell and adjusting the potentiometer until the hull has a voltage of negative 0.90 volt.

Base-two of the unijunction transistor 150 is connected to the reference voltage from voltage tap 148 through resistor 152. Resistor 152 is a temperature compensating resistor to provide peak point stability to the transistor. Base-one of the unijunction transistor 150 is connected to the gate of silicon controlled rectifier 130. The cathode of silicon controlled rectifier 130 is connected to terminal 88, which is connected to the cathodic protection system anodes, and is connected to terminal 144, which is connected to the negative output of the standard voltage source. This arrangement puts the reference voltage in series between the bases of the unijunction transistor 150 and determines the peak point voltage or threshold voltage which must be present at the emitter to cause the transistor to fire the silicon controlled rectifier. The emitter of the unijunction transistor 150 is connected to terminal 120 through the lamp 154, which is chosen to limit the emitter current to a safe value.

The voltage at terminal 120, which is the output from the full wave rectifier connected to transformer secondary winding 110, will be called the sensing voltage since it is connected in series with the voltage from the protective anode of the cathodic surface of the ship to determine the firing point of the gate. The voltage from the cathodic surface to the protective anode will be called the sensed voltage. The terms sensing voltage and sensed voltage will be applied in the same manner throughout the specification. When the sensed voltage falls, the emitter voltage is raised since the emitter voltage is the vector sum of the sensed voltage and the sensing voltage. When the emitter voltage exceeds the peak point voltage, the transistor conducts, firing the silicon controlled rectifier 130 and raising the sensed voltage. This transistor 150 performs the function of a threshold gating means with the threshold voltage being the peak point voltage. The sensed voltage should be about 2.1 volts for a hull potential of negative 0.90 volt using carbon anodes.

The value of the resistor 152 in the base-two circuit is chosen to correct the variation of the peak point voltage with temperature. The value of resistance $R_2$ which is necessary to compensate for this variation and is given by the relation:

$$R_2 = \frac{0.70 R_{BB}}{V_p} + \frac{(1-\eta) R_1}{\eta}$$

where $R_2$ is the value of the resistance in series with base-two, $R_{BB}$ is the interbase resistance, $\eta$ is the intrinsic standoff ratio, $R_1$ is the resistance in series with base-one, and $V_p$ is the peak point voltage.

In the circuit of FIG. 7 the diodes 112 and 116 may be type 1N2154R; the diodes 114 and 118 may be type 1N2154; the diodes 134, 136, 138 and 140 may be type 1N676. The unijunction transistor 150 may be type 2N1671A or type 2N489, and the silicon controlled rectifier may be type C35U or type X16CR3. The potentiometer 146 should be about 300 ohms and the resistor 152 should be 4.4 kilohms tapped at 2.4K and 1.5K.

As is understood by those skilled in the art, the circuit of FIG. 7 may be modified so as to increase its capacity. In one such modification the control unit, comprising substantially a silicon controlled rectifier and a unijunction transistor, may be applied to only one half cycle of the output such as is obtained from one end of the secondary coil of transformer 110. In this manner one half cycle is passed to the protective anodes without control and a portion of the other half cycle is passed as determined by the control unit.

Figure 8:
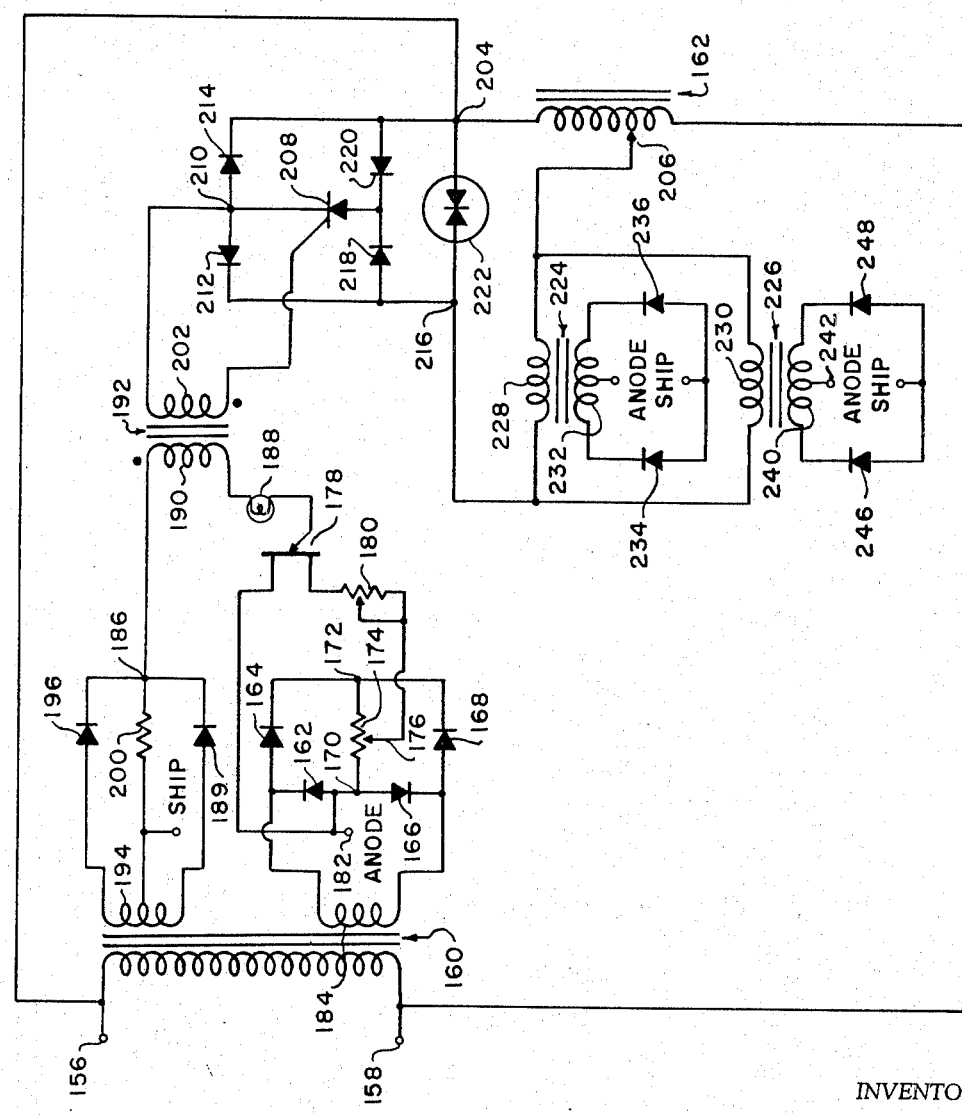
FIG. 8 is a schematic circuit diagram of a full-wave single-controlled regulated power supply having a sensing anode in accordance with another embodiment of the invention.

The controlled power supply circuit shown in FIG. 8 is similar to that of FIG. 7, but uses only the voltage of one cathodic protection system anode to regulate the current flow to all of the anodes. The AC input power is applied to terminals 156 and 158 so as to energize the primary winding of input transformer 160 and to energize the autotransformer 162, which are connected in parallel. One secondary winding 184 of transformer 160 is connected to a full-wave bridge rectifier composed of diodes 162, 164, 166 and 168 with one end of this secondary winding connected to the cathode of diode 166 and the anode of diode 168 and with the other end of this secondary winding connected to the cathode of diode 162 and the anode of diode 164. The output of the full-wave bridge rectifier appears at terminals 170 and 172. Negative terminal 170 is connected to the anodes of diodes 162 and 166 and positive terminal 172 is connected to the cathodes of diodes 164 and 168.

A potentiometer 174 is connected across terminals 170 and 172. Tap 176 on potentiometer 174 is adjusted to the reference voltage and this voltage is applied to base-two of unijunction transistor 178 through temperature compensating potentiometer 180. A sensing anode 182 is connected to terminal 170 and to base-one of the unijunction transistor. Therefore, the reference voltage is applied across base-one and base-two of the transistor; while the sensing voltage and the sensed voltage are in series in the emitter circuit of this transistor. The peak voltage point is adjusted by the reference voltage so that the unijunction transistor 178 will conduct when the sensing anode potential falls too low by raising the emitter voltage above the peak point voltage or threshold voltage.

The emitter of the unijunction transistor 178 is electrically connected to terminal 186 through current-limiting lamp 188 and through the primary winding 190 of pulse transformer 192. A DC voltage from terminal 186 triggers unijunction transistor 178 into conduction when the potential of the sensing anode falls and causes a transient voltage to appear in the primary winding of pulse transformer 192 which is used to trigger the silicon controlled rectifier so as to raise the voltage of the cathodic protection system anodes.

The DC voltage from terminal 186 is obtained from a second, secondary winding 194 of input transformer 160 and full wave rectifier composed of diode 196 connected to one end of secondary winding 194 and diode 198 connected to the other end of secondary winding 194. The cathodes of these diodes are connected to terminal 186 and the anodes to the secondary of the transformer so as to provide a positive DC voltage at terminal 186. A center tap on transformer winding 194 is grounded to the ship and connected to one end of resistor 200. The other end of resistor 200 is connected to terminal 186 to provide a return path for the rectifiers.

The transient voltage which passes through primary winding 90 of pulse transformer 192 when unijunction transistor 178 conducts is transformed to secondary winding 202 of the pulse transformer and is used to increase the voltage of the cathodic protection system anodes. The voltage for the cathodic protection anodes is taken from autotransformer 162. Terminal 204 of autotransformer 162 is connected to one end of the primary windings of a parallel group of output transformers for the cathodic protection system anodes through a gating unit. The tap 206 on autotransformer 162 is connected to the other end of the primary windings of the output transformers.

The gating unit controls the flow of current through the primary windings of the output transformers in response to the transient voltage from the pulsing transformer 192. The secondary winding 202 of the pulse transformer 192 has one end connected to the gate of silicon controlled rectifier 208 and the other end connected to terminal 210. Terminal 210 is connected to the anodes of diodes 212 and 214 and to the cathode of the silicon controlled rectifier 208. The cathode of diode 212 is connected to terminal 216 at one end of the primary windings of the output transformers and the cathode of diode 214 is connected to terminal 204 so that current may flow from the cathode of the silicon controlled rectifier to either one end of the primary windings of the output transformers or to the autotransformer and from there to the other end of the same output transformer windings. The anode of the silicon controlled rectifier is connected to the cathodes of diodes 218 and 220. The anode of diode 218 is connected to terminal 216 and the anode of diode 220 is connected to terminal 204 so as to provide a positive voltage to the anode of the silicon controlled rectifier from one of the terminals during each half cycle of voltage on autotransformer 162. A breakdown diode 222 which may be a Zener such as 6RSZ1SA5D5 is connected across terminals 216 and 204 to provide protection from transients such as those caused by the rectifier bridge.

Several cathodic protection system anodes are subject to voltage regulation from the gating circuit. These are each connected to the gating circuit through parallel output transformers such as 224 and 226 shown in FIG. 8. The transformers 224 and 226 have primary windings 228 and 230 respectively, each having one end connected to autotransformer tap 206, which may be adjusted so as to supply the proper voltage range, and each having the other end connected to terminal 216 so as to have the gating circuit in series with the source of AC power from the autotransformer. In this way the silicon controlled rectifier controls the current that flows through each of the primary windings of the output transformers.

Output transformer 224 has a secondary winding 232 for transforming the voltage from the primary winding and conducting it to the cathodic protection system anodes. The secondary winding 232 has a center tap connected to an anode of the cathodic protection system and has the cathode of diode 234 connected to one end and the cathode of diode 236 connected to the other end. The anodes of diodes 234 and 236 are grounded to the ship. Similarly transformer 226 has secondary winding 240 with center tap 242 and diodes 246 and 248 to perform the function of rectifying the AC voltage from the output transformer.

In a specific circuit in accordance with FIG. 8, silicon controlled rectifier 208 may be type 2N1847. In the gate controlling circuit, diodes 218 and 210 may be type 1N1200A and diodes 220 and 212 may be type 1N1200RA. In the reference voltage circuit diodes 162, 164 and 166 may be type 1N1693 and diode 168 may be type 1N677. Diodes 1N1693 have approximately 0.6 volt forward drop and diode 1N677 has a forward drop of 1.0 volt so that a differential of 0.4 volt is available from the rectifier bridge. Of course the potentiometer 174 may be properly adjusted without such a differential. Obviously pulse transformer 192 could be replaced by a transformer having several secondary windings each of which controls a different silicon controlled rectifier to provide flexibility in the number and arrangement of protective anodes.

Figure 9:
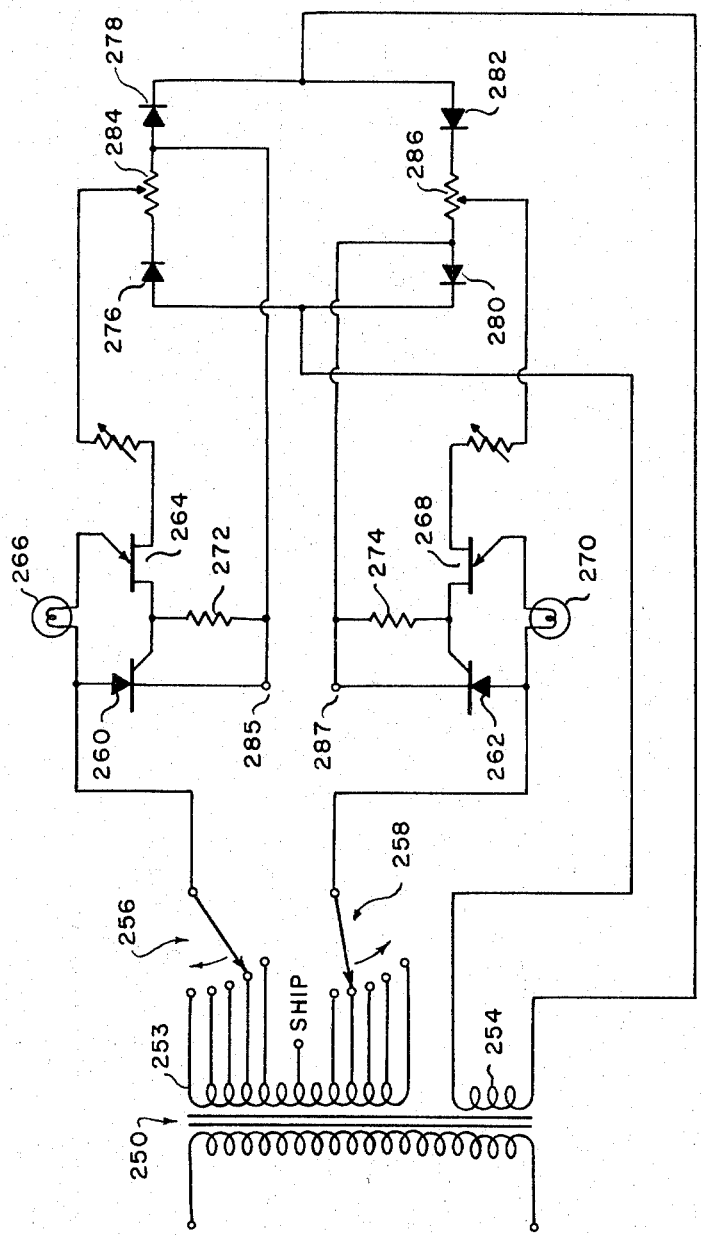
FIG. 9 is a schematic circuit diagram of a full-wave double-controlled regulated power supply in accordance with still another embodiment of the invention in which undesirable magnetic effects on the ship is reduced.

The power supply of FIG. 9 is similar to that of FIG. 7, but is double controlled and designed so as to reduce undesirable magnetic effects. It has an input transformer 250 having a power secondary winding 253 and a reference-voltage secondary winding 254. A center tap on winding 252 is grounded to the ship. Each end of the secondary winding 252 is connected to a different poles 256 or 258, of a ganged stepping switch, for adjusting the input current when the ship's potential is to be substantially changed.

The poles of the stepping switch are each connected to the anode of a silicon controlled rectifier so that one end of the transformer winding 253 is electrically connected to the anode of silicon controlled rectifier 260 stepping switch pole 256 and the other end of transformer winding 253 is electrically connected to the anode of silicon controlled rectifier 262 through stepping-switch 258. The cathodes of silicon controlled rectifiers 260 and 262 are each connected to the anodes of the cathodic protection system so as to control the flow of current in a pushpull arrangement.

The emitter of unijunction transistor 264 is connected to the anode of silicon controlled rectifier 260 through current-limiting lamp 266 and base-one of the unijunction transistor is connected to the gate of the silicon controlled rectifier so that current will flow from the stepping switch 256 to the gate when the unijunction transistor is biased into conduction and the silicon controlled rectifier will be fired. The emitter of unijunction transistor 268 is connected to the anode of silicon controlled rectifier 262 through current-limiting lamp 270 and base-one of the unijunction transistor is connected to the gate of the silicon controlled rectifier. Therefore, current will flow from the stepping switch 258 to the gate when the unijuction transistor is biased into conduction which, in turn, will cause the silicon controlled rectifier to be fired. Base-one of the unijunction transistor 264 is connected to the cathodic protection system anodes by resistor 272; base-one of the unijunction transistor 268 is connected to the cathodic protection system anodes by resistor 274.

Means establishing a reference voltage is connected between the bases of the unijunction transistors to establish the emitter peak voltage point, which determines when the transistors will fire the silicon controlled rectifiers to raise the potential of the cathodic protection system anodes. This reference voltage is derived from the full wave rectifier bridge including diodes 276, 278, 280 and 282. The anode of diode 276 and the cathode of diode 280 are connected to one end of secondary winding 254; the anode of diode 282 and the cathode of diode 278 are connected to the other end of this secondary winding. Potentiometer 282 is connected between the anode of diode 278 and the cathode of diode 276; potentiometer 286 is connected between the anode of diode 280 and the cathode of diode 282.

The current from silicon controlled rectifier 260 passes to terminal 285 and from terminal 285 in one direction around the hull of the ship and the current from silicon controlled rectifier 262 passes to terminal 287 and from terminal 287 in the opposite direction around the hull of the ship so as equalize the magnetic field effect on the ship's degaussing system created by the cathodic protection system current. This may be accomplished by a variety of cable arrangements known to persons skilled in the art.

Figure 10:
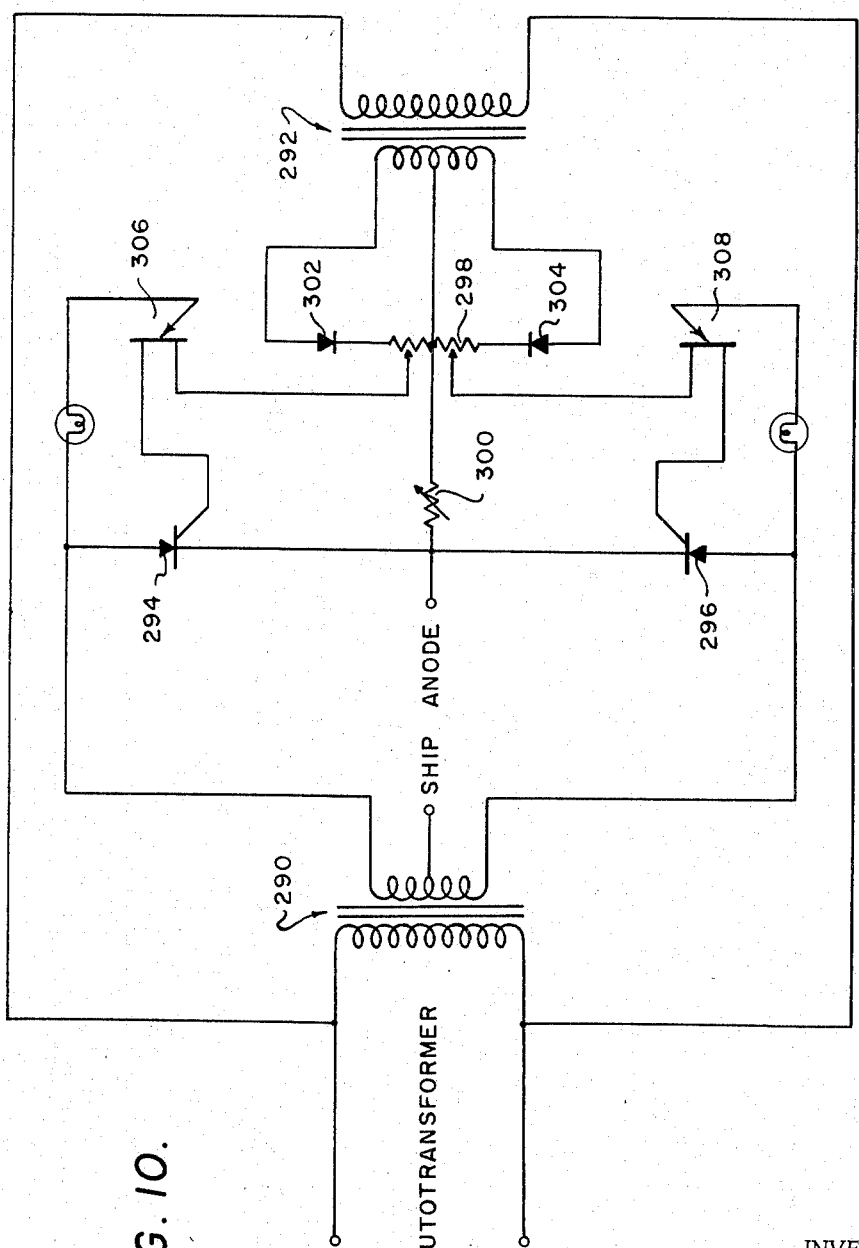
FIG. 10 is a schematic circuit diagram of a full-wave double-controlled regulated power supply in accordance with a further embodiment of the invention.

The power supply of FIG. 10 is also double controlled. Transformer 290 provides the power for the cathodic protection system anodes and transformer 292 provides the voltage for the reference circuit. These two transformers are connected in parallel across an autotransformer. One end of the secondary winding of transformer 290 is connected to the anode of silicon controlled rectifier 294 and the other end is connected to the anode of the silicon controlled rectifier 296. A center tap on transformer 290 is grounded to the ship. The cathodes of silicon controlled rectifiers 294 and 296 are each connected to the cathodic protection system anodes, to a center tap on transformer 292 and to a center tap on resistor 298 through resistor 300. One end of resistor 298 is connected to the cathode of diode 302 and the other end to the cathode of diode 304. The anodes of these diodes are connected to the opposite ends of the secondary winding of transformer 292 to provide a rectifier reference voltage for the base circuits of the unijunction transistors 306 and 308. Unijunction transistor 306 has base-one connected to the gate of silicon controlled rectifiers 294, base-two connected to resistor 298, and its emitter connected to the anode of silicon controlled rectifier 294; unijunction transistor 308 has base-one connected to the gate of silicon controlled rectifier 296, base-two connected to resistors 298 and its emitter connected to the anode of silicon controlled rectifier 296.

Figure 11:
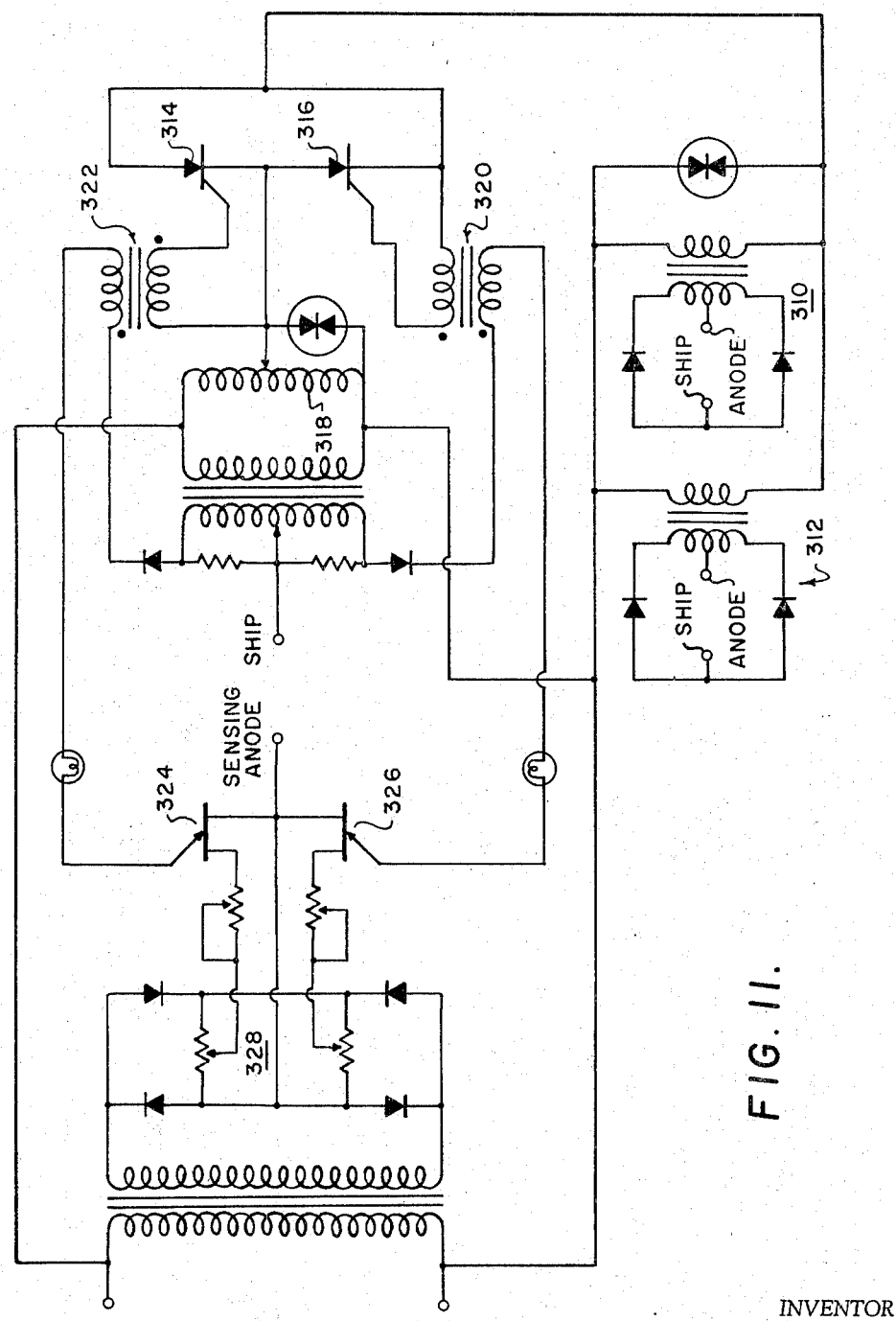
FIG. 11 is a schematic circuit diagram of a full-wave double-controlled regulated power supply with a sensing anode utilized in a still further embodiment of the invention.

The power supply of FIG. 11 utilizes a sensing anode and separate output transformers for each cathodic protection system anode in the manner of the power supply of FIG. 8, but is double controlled. The output units 310 and 312 rectify the controlled AC voltage and apply a positive voltage to the anodes and a negative voltage to the ship. Silicon controlled rectifiers 314 and 316 control the current flow to the output transformers on alternate cycles. The voltage, which is applied to the output transformers, is obtained from autotransformer 318 which is connected to one end of the primary windings of the output transformers and has its center tap connected to silicon controlled rectifiers 314 and 316. Silicon controlled rectifiers 314 and 316 are in parallel with each other but oppositely poled. This parallel combination is connected in series with the other end of the primary windings of the output transformers so as to control the current flow through them.

A sensing circuit opens the silicon controlled rectifiers when the anode voltage falls too low and closes the silicon controlled rectifiers when the anode potential is high enough to provide cathodic protection. Gating transformers 322 and 320 connect the sensing circuit to the gates of the silicon controlled rectifiers. Each of these gating transformers is connected to the gate of one of the silicon controlled rectifiers and to the emitter of either unijunction transistor 324 or 326. The base circuit of each of the unijunction transistors 324 and 326 is connected to a sensing anode and to a source of reference voltage from bridge circuit 328. The reference voltage determines the emitter peak point voltage. A reduction in the anode potential raises the emitter voltage causing conduction in the emitter circuit of the unijunction diode and the opening of the silicon controlled rectifiers.

Figure 12:
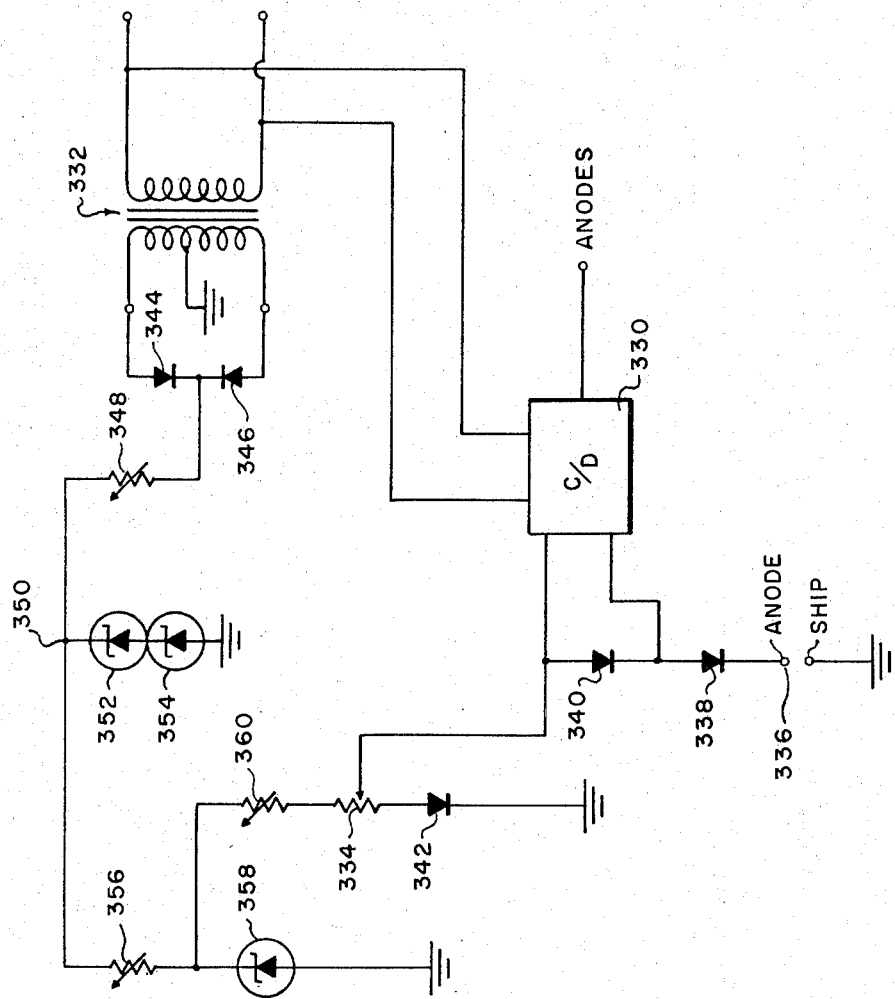
FIG. 12 is a schematic circuit diagram of regulated power supply adapted for direct reading of the potential of the structure which is protected by the cathodic protection system in accordance with the invention.

FIG. 12 is a schematic circuit diagram of a power supply illustrating an embodiment of the invention which utilizes a phase switch with a full 180° range of control and an improved reference voltage means. The cathodic protection unit 330 receives AC power from the primary winding of transformer 332 which may be energized by the ship's power. The cathodic protection unit is a phase shift control unit which fires silicon controlled rectifiers at different times in each half cycle of the input voltage as determined by the sensed voltage. The potentiometer 334 and the anode terminal 336 are connected in parallel at the input to the cathodic protection unit and the potentiometer is adjusted so that the silicon controlled rectifiers will be gated if the ship's potential falls too low.

Diode 342 is connected in series with the anode 336 to prevent it from acting as a battery. Diode 340 limits the input voltage to the control unit 330 to about 0.6 volt. The secondary winding of transformer 332 provides an output which is rectified by diodes 344 and 346 to provide a DC output for use as a reference voltage. The anodes of diodes 344 and 346 are each connected to different ends of the secondary winding of transformer 332 and their cathodes are connected to one end of potentiometer 348 so that a full wave rectifier current is passed through the potentiometer.

The other end of the potentiometer 348 is connected to a voltage divider at terminal 350. Zener diodes 352 and 354 are connected in series between terminal 350 and ground with their anodes connected to the ground side of the circuit. This combination provides a constant DC voltage to the rest of the potential divider from terminal 350. Potentiometer 356 is connected to terminal 350 at one end and the cathode of Zener diode 358 at the other end. The anode of Zener diode 358 is grounded. The standard voltage is taken from this voltage divider at a point between the cathode of the Zener diode 358 and the potentiometer 356. This reference voltage is applied to potentiometer 360 and then to potentiometer 334 which is in series with potentiometer 360 on one end and diode 342 on the other. The output to the comparison diode 340 is taken from the tap of potentiometer 334.

Figure 13:
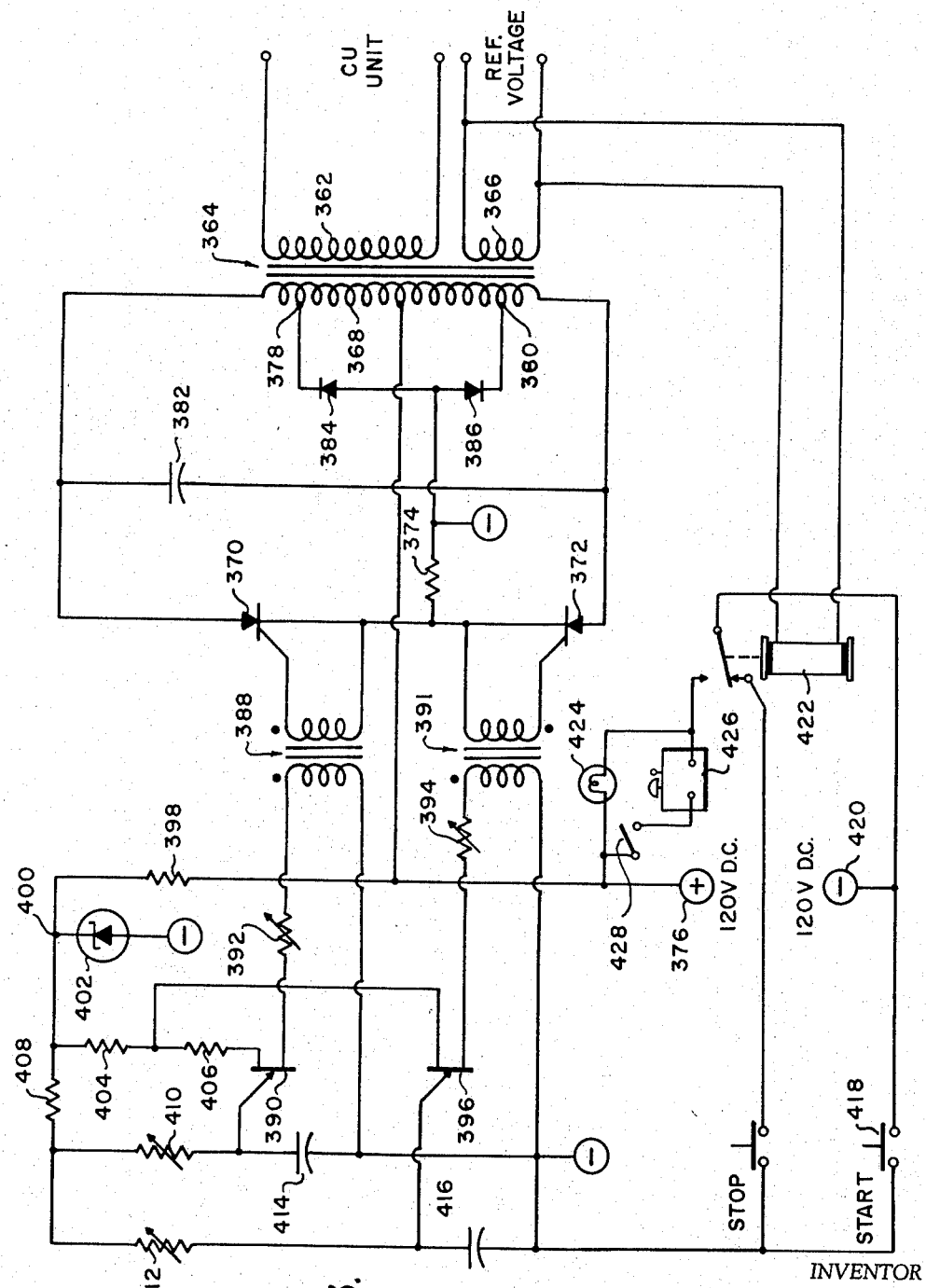
FIG. 13 is a schematic circuit diagram of an inverter in accordance with the invention.

The power supplies of this invention are intended to be operated from an AC power source. However, many ships are equipped with a main source DC power rather than with AC power. FIG. 13 is a schematic circuit diagram of an inverter which can convert the ship's DC power suitable for use by the cathodic protection system power supply.

AC power for a cathodic protection unit is taken from secondary winding 362 of output transformer 364 and AC power for the reference voltage is taken from secondary winding 366 of the same transformer. Secondary winding 366 is also connected to the inverter alarm system.

The primary winding 368 of output transformer 364 is connected to a parallel inverter, the main components of which are silicon controlled rectifiers 370 and 372. These two silicon controlled rectifiers each have their anodes connected to a different end of the primary winding 368 and have their cathodes connected to the same end of inductor 374. The other end of inductor 374 is grounded. A capacitor 382 is connected across the primary winding 368 from the anode of silicon controlled rectifier 370 to the anode of silicon controlled rectifier 372. The primary winding has a center tap connected to the positive DC power supply 376. The primary winding 368 is also tapped on both sides of the center tap at 378 and 380. The cathode of diode 384 is connected to tap 378 and its anode is grounded; the cathode of diode 386 is connected to tap 380 and its anode is also grounded.

The silicon controlled rectifiers 370 and 372 are alternately triggered into conduction by positive pulses applied to their gate electrodes through gate transformers 388 and 390 respectively. When silicon controlled rectifier 370 is conducting the current from supply 376 will flow through the upper part of primary winding 368 and will produce a voltage of approximately twice that of the source across the capacitor 382 and at the anode of silicon controlled rectifier 372. The voltage at the anode of silicon controlled rectifier will become approximately equal to a negative value twice that of the voltage source 376.

The next positive trigger pulse is applied to both gating transformers 388 and 390 simultaneously. However, silicon controlled rectifier 370 is not in condition to conduct because its anode voltage is negative while the silicon controlled rectifier is in a condition to conduct since its anode voltage is positive. Therefore, silicon controlled rectifier 372 will become conductive and the voltage across capacitor 382 and at the anode of silicon controlled rectifier 370 will be reversed by the current flowing through the lower portion of primary winding 368. The next trigger pulse is only applied to transformer 388 and reverts the inverter to its original state. It can be seen that the current will alternately flow through opposite portions of the primary winding 368 to cause an AC voltage to appear at the secondary windings of transformer 364 for use in the cathodic protection power supply.

The inductance 374 serves as a ballast to prevent excessive current flow during switching. The reactance of inductor 374 is equal in magnitude to the reactance of capacitor 382 at 60 cycles per second. The diodes 384 and 386 are connected to taps 378 and 380 of primary winding 368 to provide a rising voltage prior to switching. The inductor 374 also aids the switching by providing a turn-off back-bias to the silicon controlled rectifiers.

The positive trigger pulses are applied to gate transformers 388 and 390 by two unijunction-transistor relaxation oscillators. Positive trigger pulses at 120 c.p.s. are applied to gate transformer 388 through potentiometer 398 from base-one of unijunction transistor 390 and positive trigger pulses at 60 c.p.s. are applied to gate transformer 390 through potentiometer 394 from base-one of unijunction transistor 396.

The voltage for the two unijunction-transistor relaxation oscillators is derived from source 376 through a voltage control circuit. The voltage control circuit has a resistor 398 with one end connected to voltage source 376 and the other end connected to terminal 400. Zener diode 402 has its cathode connected to terminal 400 and its anode grounded so as to maintain a fixed voltage. This voltage is applied to base-two of unijunction transistor 396 through resistor 404 and is applied to base-two of unijunction transistor 390 through resistor 406 and resistor 414 in series. This voltage is also applied to the emitter of unijunction transistor 390 through resistor 408 and frequency determining potentiometer 410 in series and is applied to the emitter of unijunction transistor 396 through resistor 408 and frequency determining potentiometer 412 in series.

The emitter of unijunction transistor 390 is connected to one side of capacitor 414; the other side of capacitor 414 is connected to the primary winding of both gating transformers 388 and 391 on the opposite end as the respective base-one connections. The emitter of unijunction transistor 396 is connected to one side of capacitor 416; the other side of capacitor 416 is connected to the same end of gating transformer 391 as is capacitor 414 and is also connected to a starting circuit.

The capacitor 414 is charged through potentiometer 410 until the emitter of unijunction transistor 390 reaches the peak voltage point at which the transistor begins to conduct and discharges capacitor 414. When the emitter voltage reaches the turn-off point of approximately 2 volts, unijunction transistor 390 ceases to conduct and the cycle starts again. These oscillations are at 120 c.p.s. and send a trigger pulse to gating transformer 388 and a synchronization pulse to the oscillator which includes unijunction transistor 392 on each cycle.

The capacitor 416 is charged through potentiometer 412 until the emitter of unijunction transistor 396 reaches the peak voltage point at which time the transistor conducts discharging capacitor 416. When the emitter voltage reaches the turn-off valve the transistor stops conducting and the cycle is repeated. These oscillations are at 60 c.p.s. and provide pulses to gating transformer 391 each cycle.

The oscillations are started by closing switch 418 which connects capacitor 416 to negative source 420. Once oscillations have started this switch may be opened again. Once the inverter is operating, AC relay 422 will be activated since it is connected to secondary winding 366. This will open switch 428 so that lamp 424 and alarm 426 will not operate. Switch 428 is closed to connect the alarm 426 into the circuit. If the inverter should fail relay 422 would open closing a circuit from positive source 376 to lamp 424 and alarm 426 to negative source 420 causing the lamp to light and the alarm to operate.

Figure 14:
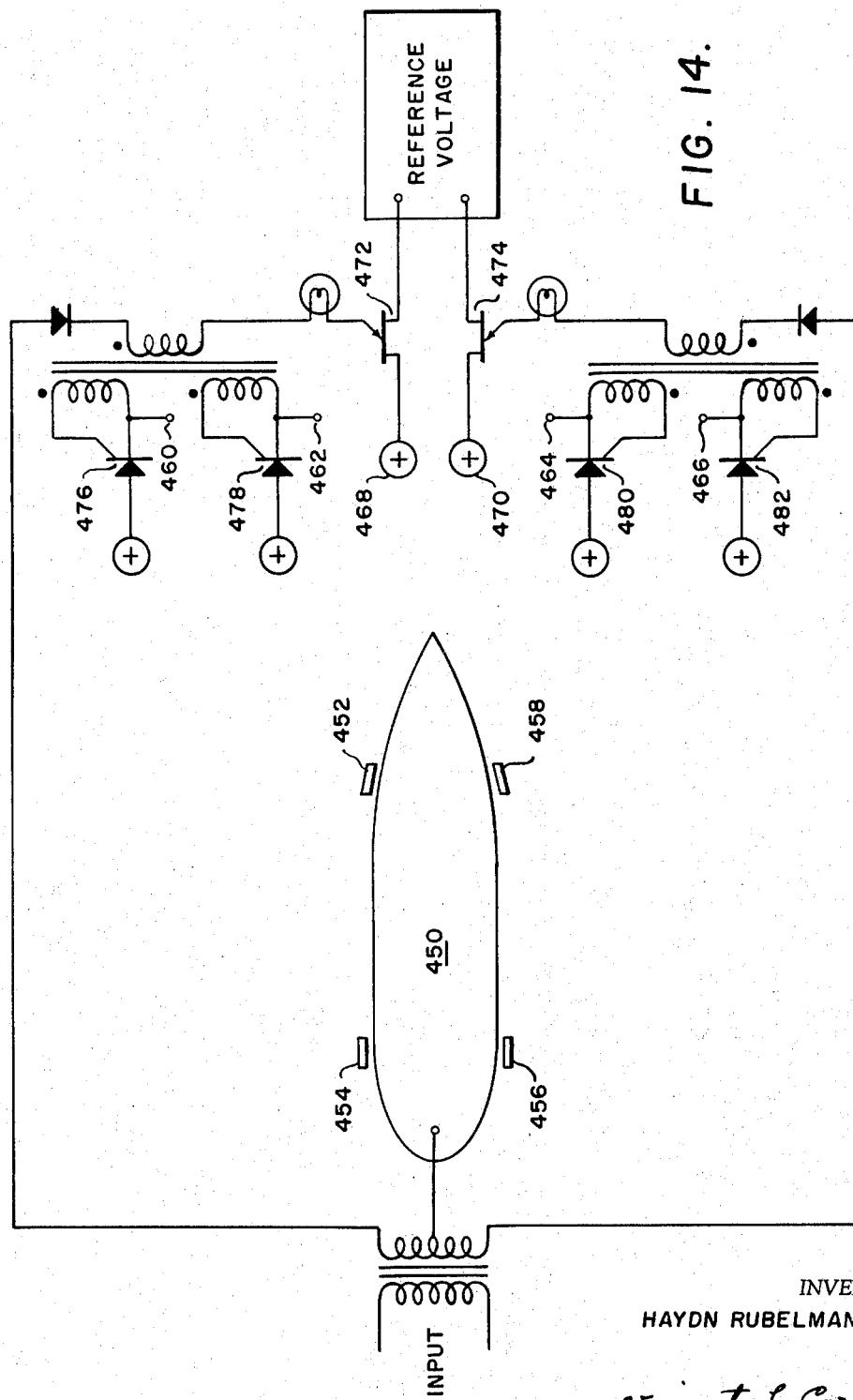
FIG. 14 is a schematic circuit diagram of an embodiment of the invention used to correct for variations in current demand from different portions of the protected structure.

FIG. 14 is an embodiment of the invention which will correct for variations in current demand from different portions of the protected structure. These differences in demand are caused by the shunting effect on the protective current by temporary adjacent structures such as other ships.

Referring now more specifically to FIG. 14, in which 450 refers to a protected structure such as a ship, four anode groups are shown schematically as 452, 454, 456, and 458. Terminals 468 and 470 are electrically connected to anode groups 452 and 456 respectively. Terminals 460, 462, 464 and 466 are connected to anode groups 454, 452, 456 and 458 respectively.

The sensed voltage is taken between the hull of the ship and anode groups 452 and 456. The sensed voltage associated with anode group 452 is connected to terminal 468 and is in series with the sensing voltage in the emitter circuit of unijunction transistor 472; the sensed voltage associated with anode group 456 is connected to terminal 470 and is in series with the sensing voltage in the emitter circuit of the unijunction transistor 474. Silicon controlled rectifiers 476 and 478 are fired by unijunction transistor 472 so that the cathodic protection anodes on one side of the ship are controlled by a sensed voltage on that side of the ship and the cathodic protection anodes on the other side of the ship are controlled by a sensed voltage on the other side of the ship. In this manner a localized control is provided which will correct for variations in current demand from different portions of the protected structure.

FIG. 15 is a section of a cathodic protection anode and the housing for this anode. The housing can be welded to the hull and the anode assembly can be replaced at any time by a shallow water diver or skin diver. The hull of the ship 484 is welded to the steel housing 486. A connector, comprised of a brass-cadmium plated conductor 488 and a nylon molded insulator 490, is inserted from the inside of the ship to provide an electrical connection to the controlled power supply. This connector is sealed to the housing by packing placed between packing ring 496 and packing washer 492. The packing washer is held in place by packing nut 498. The anode assembly, comprised of brass-cadmium plated conductor 500 which screws into the connector, anode material 504 molded around the conductor 500 and nylon molded anode insulating base 502, is inserted from the outside of the ship and may be replaced. The anode assembly is held in place by nylon anode retainer 506, which is screwed to housing 486.

The cathodic protection system of this invention provides automatic control which is of general utility but is especially desirable when a ship is in motion. It eliminates the need for time-consuming measurements and adjustments of the voltage output from the cathodic protection system power supply. The regulated power supply used in this system is compact, sturdy and inexpensive. It can withstand heavy vibration and requires little maintenance.

Obviously many modifications and variations of the present invention are possible in the light of the above teachings. It is therefore to be understood that within the scope of the appended claims the invention may be practiced otherwise than as specifically described.

What is claimed is:

1. In a cathodic protection system means for detecting changes in potential difference between an object being protected and a protection anode irrespective of environmental conditions or previous regulatory currents existing therebetween, comprising:
   a source of power;
   first and second sources of differing static electrical potential in which the said object and anode are respectively located;
   threshold gating means having a first input element connected to said source of power and to said first source of potential, and a second input element connected to said second source of potential;
   said gating means having a further element whereby a small operating current normally flows between said second and further elements;
   means isolating said small current flow from said sources of potential;
   said threshold gating means being biased to non-conduction between said first and second input elements when the potential difference between said sources of potential is at a predetermined level and being biased to conduction when the difference in potential between said sources of potential decreases from said predetermined level by a predetermined amount.

2. In a cathodic protection system according to claim 1 wherein said threshold gating means comprises a unijunction transistor and said first, second and further elements thereof respectively comprise an emitter, a base-one and a base-two.

3. In a cathodic protection system according to claim 2 wherein said gating means comprises a separate biasing circuit connected to said base-one and to said base-two.

4. In a cathodic protection system control apparatus for controlling the potential difference between an object being protected and a protection anode independently of any current flow between said object and anode, comprising:
   a source of power;
   an electrical transistor having a threshold conductive characteristic, said transistor having a first electrode connected to said source;
   first and second sources of differing static electrical potential, said sources representing the respective object and anode between which the potential difference is to be controlled;
   said first source being connected to said first electrode and said second source being connected to a second electrode of said transistor thereby rendering said transistor non-conductive between said first and second electrodes;
   said transistor having a third electrode and said transistor having an operating characteristic whereby a small operating current normally flows between said second and third electrodes;
   means connected in circuit with said second and third electrodes for isolating said small current flow from said second source;
   whereby when said first and second static sources are exposed to a material capable of passing current, and said transistor may be driven to its threshold conductive condition to thereby produce an output pulse for controlling said potential difference.

5. In a cathodic protection system a control circuit for producing an output pulse responsive to a change in potential difference between an object being protected and a protection anode having respectively different electrical potentials comprising:
   a source of power;
   threshold gating means comprising a unijunction transistor connected in circuit with said source of power and said object and anode whereby said gating means is blocked responsive to a predetermined potential difference between said object and anode, and turned on responsive to a decrease in said potential difference;
   separate biasing means connected in circuit with said threshold gating means for isolating the operating current of said gating means from said object and anode,
   said object and anode comprising respectively a normally negative ship's hull and a normally positive anode of material whereby no appreciable current, ipso facto, passes between said anode and cathode when immersed in an electrolyte, and circuit means coupling said threshold gating means in circuit with said anode and ship's hull whereby, a protective coating of hydrogen is formed in close proximity to said hull, responsive to current flow via an electrolyte therebetween.

6. In a cathodic protection system power supply having an A.C. input voltage, a standard voltage source, and a D.C. output voltage: a voltage regulator comprising:
   an output terminal for said D.C. output voltage;
   means for obtaining a reference voltage from said standard voltage source;
   comparison means, electrically connected to said output terminal and to said means for obtaining a reference voltage, for providing an output gating voltage which is indicative of the ratio between said D.C. output voltage and said reference voltage;
   a gating means electrically connected to said output terminal and to said A.C. input voltage for controlling the flow of current therethrough from said A.C. input voltage to said output terminal;
   said gating means being electrically connected to said comparison means and controlled by said output gating voltage, whereby the voltage of said output terminal is controlled;
   a ground return for the power supply;
   said gating means comprises a first and second silicon controlled rectifier;
   said comparison means comprises a unijunction transistor having its emitter electrically connected to the anode of said first silicon controlled rectifier, its first base connected to the gate of said first silicon controlled rectifier, and its second base connected to said means for obtaining a reference voltage; and
   a second unijunction transistor having its emitter electrically connected to the anode of said silicon controlled rectifier, its first base connected to the gate of said silicon controlled rectifier and its second base connected to said means for obtaining a reference voltage.

7. A control unit for automatic cathodic protection of a structure which is immersed in salt water so as to act as a cathode, comprising:
   a protection anode to be immersed in said salt water;
   a source of electric power for maintaining a potential between said protection anode and said structure;
   a transformer having a primary winding with input terminals electrically connected to said source of power and a secondary winding with an output terminal at each end and at a center tap;
   a first and second silicon controlled rectifier, each having its anode electrically connected to a different one of said output terminals at each end of said transformer secondary, whereby the flow of current from said transformer secondary is controlled;

a standard voltage source;
means electrically connected to said standard voltage source for obtaining a reference voltage from said standard voltage source;
a first unijunction transistor, electrically connected to said first silicon controlled rectifier, having said potential between said control-unit anode and said structure electrically connected between the emitter and base-one of said first unijunction transistor and having said reference voltage means electrically connected between base-one and base-two of said first unijunction transistor;
a second unijunction transistor, electrically connected to said second silicon controlled rectifier, having said potential between said control-unit anode and said structure electrically connected between the emitter and base-one of said second unijunction transistor and having said reference voltage means electrically connected between base-one and base-two of said second unijunction transistor;
said protection anode being electrically connected to the cathodes of said first and second silicon controlled rectifiers whereby the voltage of said protection anode is regulated with respect to said reference voltage.

8. In a cathodic protection system for detecting changes in potential differences between an object being protected and a protection anode irrespective of environmental conditions or the previous regulatory currents existing therebetween comprising:
  a first transformer having a primary winding, a center-tapped secondary winding and another secondary winding;
  a resistor having one of its ends connected to the center-tap of the centertapped secondary winding;
  a first and second diode, each of said diodes having their respective anodes connected to the other ends of said centertapped secondary winding, the cathodes of said first and second diodes being connected to the other end of said resistor;
  a second transformer having a primary and secondary winding, one end of said secondary transformer primary windings being connected to said cathodes of said first and second diodes;
  a unijunction transistor having an emitter electrode and first and second base electrodes, the emitter electrode of said unijunction transistor being connected to the other end of said primary winding of said secondary transformer;
  a third and fourth diode having their respective anodes connected to the ends of the other secondary winding of said first transformer, the cathodes of said third and fourth diodes being connected together;
  a fifth and sixth diode having the cathode of the fifth diode connected to the anode of said third diode and the cathode of the sixth diode connected to the anode of said fourth diode, the anodes of the fifth and sixth diodes being connected together, said first base electrode of said unijunction transistor being connected to the anodes of said fifth and sixth diode;
  a variable potentiometer having one end connected to the anodes of the fifth and sixth diodes and its other end connected to the cathode of said third and fourth diode, the center tap terminal being connected to the other base electrode of said unijunction transistor;
  a bridge network comprising a seventh and eighth diode having their anodes connected together and a ninth and tenth diode having their cathodes connected together, the cathode of the seventh diode being connected to the anode of the ninth diode and the cathode of the eighth diode being connected to the anode of the tenth diode;
  a silicon control rectifier having its cathode connected to the anodes of the seventh and eighth diodes, the secondary winding of said second transformer having one of its ends connected to the cathode of said silicon control rectifier and its other end connected to the control electrode of said silicon control rectifier, the anode of said silicon control rectifier being connected to the cathodes of said ninth and tenth diodes, said anode of said ninth diode being connected to one end of the primary winding of said first transformer;
  a zener diode being connected between the anodes of the ninth and tenth diode;
  an auto-transformer having one of its ends connected to the anode of said ninth diode and its other free end connected to the other end of said primary winding of said first transformer;
  a third transformer having a primary and secondary winding, one end of the primary winding being connected to the center tap on said auto-transformer and the other end of said primary winding being connected to the said anode of said tenth diode;
  an eleventh and twelfth diode having their cathodes connected to the respective ends of said secondary winding of said third transformer, said third transformer secondary winding having a center tap, the anodes of said eleventh and twelfth diodes being connected together;
  a fourth transformer having a primary and secondary winding, said primary winding of said fourth transformer being connected in parallel with said primary winding of said third transformer;
  a thirteenth and fourteenth diode having their respective cathodes connected to the respective ends of said secondary winding of said fourth transformer, the anodes of said thirteenth and fourteenth diodes being connected together; and
  a ship having a cathodic protection anode associated therewith, said ship being electrically connected to the center tap of said secondary winding of said first transformer and the anodes of said eleventh, twelfth, thirteenth and fourteenth diodes, said cathodic protection anode being electrically connected to the anodes of said fifth and sixth diodes and said center taps of said secondary winding of said third and said fourth transformer, whereby said ship is cathodically protected.

References Cited

UNITED STATES PATENTS

| | | | |
|---|---|---|---|
| 2,221,997 | 11/1940 | Polin | 204—196 |
| 2,918,420 | 12/1959 | Sabins | 204—196 |
| 2,977,523 | 3/1961 | Crockrell | 323—22 |
| 2,982,714 | 5/1961 | Sabins | 204—196 |
| 3,074,008 | 1/1963 | McPhail et al. | 323—22 |
| 3,095,534 | 6/1963 | Crockrell | 321—46 |
| 3,098,026 | 7/1963 | Anderson | 204—196 |
| 2,759,887 | 8/1956 | Miles | 204—196 |
| 2,912,635 | 11/1959 | Moore | 322—25 |
| 3,061,773 | 10/1962 | Ellison et al. | 204—196 |
| 3,129,380 | 4/1964 | Lichowsky | 322—22 |
| 3,242,064 | 3/1966 | Byrne | 204—147 |

FOREIGN PATENTS

| | | |
|---|---|---|
| 221,673 | 6/1962 | Austria. |

OTHER REFERENCES

"Basic Electrical Engineering," 2d ed., 1957 pp. 412–417.

Sudbury et al.: "Corrosion," vol. 16, No. 2, February 1960, pp. 47t–54t.

HOWARD S. WILLIAMS, *Primary Examiner.*

MURRAY TILLMAN, JOHN H. MACK, *Examiners.*

T. H. TUNG, *Assistant Examiner.*